United States Patent [19]

Dever

[11] Patent Number: 4,878,683

[45] Date of Patent: Nov. 7, 1989

[54] UNITARY HUB ASSEMBLY

[75] Inventor: James A. Dever, Bay Village, Ohio

[73] Assignee: Green Ball Bearing Company, Cleveland, Ohio

[21] Appl. No.: 224,343

[22] Filed: Jul. 26, 1988

[51] Int. Cl.⁴ .............................................. B62D 7/18
[52] U.S. Cl. .................................. 280/96.1; 280/103; 180/253
[58] Field of Search ........................ 280/93, 96.1, 103; 180/253

[56]  References Cited
U.S. PATENT DOCUMENTS

| | | | |
|---|---|---|---|
| 3,940,159 | 2/1976 | Pringle | 280/96.1 |
| 4,504,099 | 3/1985 | Miki et al. | 280/96.1 |
| 4,618,159 | 10/1986 | Kozyra et al. | 280/93 |
| 4,722,540 | 2/1988 | Kuzyra et al. | 280/93 |

OTHER PUBLICATIONS

Bulletin-hub assemblies for GM front wheel drive cars, Bulletin HUB-86-9, Sep. 1, 1986.
Page from a Chrysler repair manual, pp. 2-499, undated.

Primary Examiner—Kenneth R. Rice
Attorney, Agent, or Firm—Tarolli, Sundheim & Covell

[57]  ABSTRACT

The present invention relates to a unitary hub assembly for use in mounting a driven wheel on a steering knuckle of a vehicle. The unitary hub assembly has a hub adapted to be connected with a drive shaft and the driven wheel. A bearing assembly is connected to the hub to support the hub for rotation relative to the steering knuckle. The hub assembly also has a flange which is connected to the bearing assembly and the steering knuckle. The flange secures the hub assembly to the steering knuckle. When the hub is connected with the driven wheel and the steering knuckle, it supports the wheel for rotation relative to the steering knuckle and transmits drive and steering forces to the wheel.

12 Claims, 4 Drawing Sheets

UNITARY HUB ASSEMBLY

BACKGROUND OF THE INVENTION

1. Field of the Invention

The present invention relates to a wheel support assembly for use in transmitting drive and steering forces to a driven wheel in a vehicle.

2. Prior Art

A known wheel support assembly for a steerable and driven front wheel of a vehicle includes a steering knuckle which transmits steering forces to the wheel. A drive shaft extends through an opening in the steering knuckle to a hub connected with the wheel. A plurality of ball bearings support the hub for rotation relative to the steering knuckle.

When the hub is to be mounted on the steering knuckle, a ball bearing assembly is press fitted into a recess in the steering knuckle. Interference between the ball bearing assembly and the steering knuckle holds the bearing assembly in place. A gasket and retainer are then bolted to the steering knuckle over the bearing assembly. The hub is inserted through the retainer and gasket and is press fitted into the bearing assembly. The hub is secured to the drive shaft by a spline connection and a hub nut. The driven wheel is then bolted to the hub. Steering and drive forces can then be transmitted to the driven wheel.

The bearing assembly is mounted in the recess in the steering knuckle with an interference fit. The hub is, in turn, mounted in the bearing assembly with an interference fit. The necessity of establishing an interference fit between the steering knuckle and bearing assembly and between the hub and bearing assembly makes replacement of the bearing assembly very difficult for many mechanics. The fact that the hub, retainer, gasket and bearing assembly are all separate pieces is also an inconvenience and may lead to assembly errors during the replacement of a bearing assembly.

SUMMARY OF THE INVENTION

The present invention provides a unitary hub assembly for use in mounting a driven wheel on a steering knuckle of a vehicle. The unitary hub assembly has a hub adapted to be connected with a drive shaft and the driven wheel. The hub is supported for rotation relative to the steering knuckle by a bearing assembly. The bearing assembly is slidably received in a recess in the steering knuckle. A mounting flange connected to one end of the bearing assembly is secured to the steering knuckle to hold the hub assembly in place on the steering knuckle. When the hub assembly is connected to the wheel and the steering knuckle, it supports the wheel for rotation relative to the steering knuckle and transmits drive and steering forces to the wheel.

Since the mounting flange is connected to one end of the bearing assembly, the bearing assembly is almost entirely received in the recess in the steering knuckle. This enables the steering knuckle to provide a solid support for the bearing assembly. The solid support for the bearing assembly results in the hub supporting the steerable driven wheel in a desired position relative to the vehicle.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF A SPECIFIC PREFERRED EMBODIMENTS OF THE INVENTION

General Description

Figure 1:
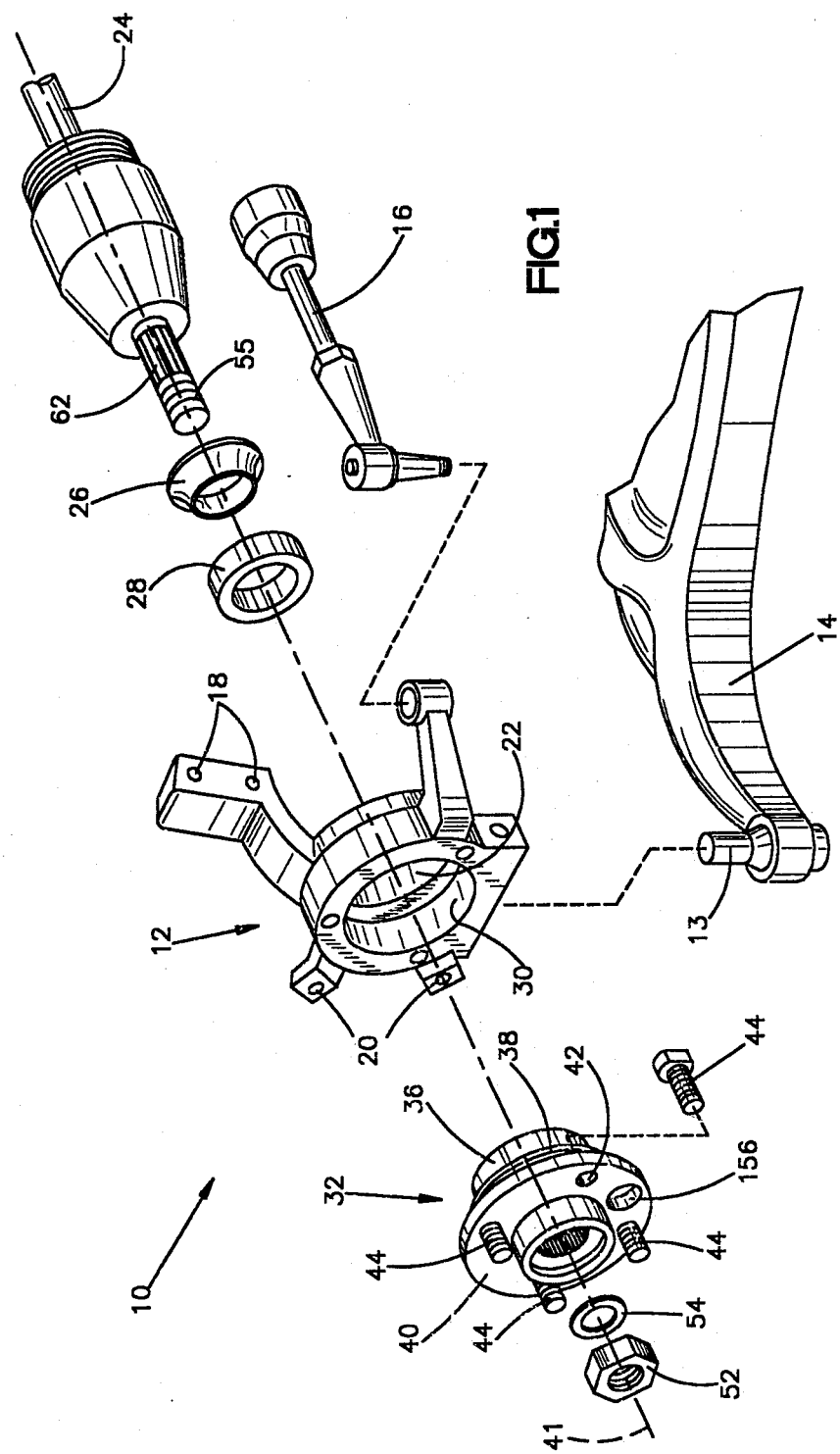
FIG. 1 is an exploded and somewhat schematic illustration of a steerable driven wheel support assembly.

A steerable driven wheel support assembly 10 for use in a vehicle is illustrated in FIG. 1. The steerable driven wheel support assembly 10 supports a front wheel (not shown) for rotation relative to the vehicle. The wheel support assembly 10 also transmits drive and steering forces to the front wheel.

The steerable driven wheel support assembly 10 includes a steering knuckle 12 mounted on a stud 13 on a lower control arm 14 of the vehicle. The steering knuckle 12 can pivot relative to the lower control arm 14 under the influence of steering forces. The steering forces are transmitted to the steering knuckle 12 by a steering linkage 16 which is connected to the steering knuckle.

When a steering force is applied to the steering linkage 16, it causes the steering knuckle 12 to pivot relative to the lower control arm 14. The steering knuckle 12 has openings 18 to allow a strut damper (not shown) to be connected with the steering knuckle. The steering knuckle 12 also has openings 20 to allow a brake caliper (not shown) to be connected with the steering knuckle.

The steering knuckle 12 has an opening 22 extending through the steering knuckle. A drive shaft 24 extends through the opening 22 in the steering knuckle 12 to allow drive forces to be transmitted to the wheel. A wear sleeve 26 and a seal 28 protect the drive shaft 24. The construction of the steering knuckle 12, steering linkage 16 and drive shaft 24 are well known and will not be further described herein to avoid prolixity of description.

A unitary hub assembly 32, constructed in accordance with the present invention, is mounted in a recess 30 in the steering knuckle 12. The unitary hub assembly 32 is connected to the steering knuckle 12, the drive shaft 24 and the vehicle wheel. Therefore, the hub assembly 32 can transmit driving and steering forces to the wheel.

Figure 2:
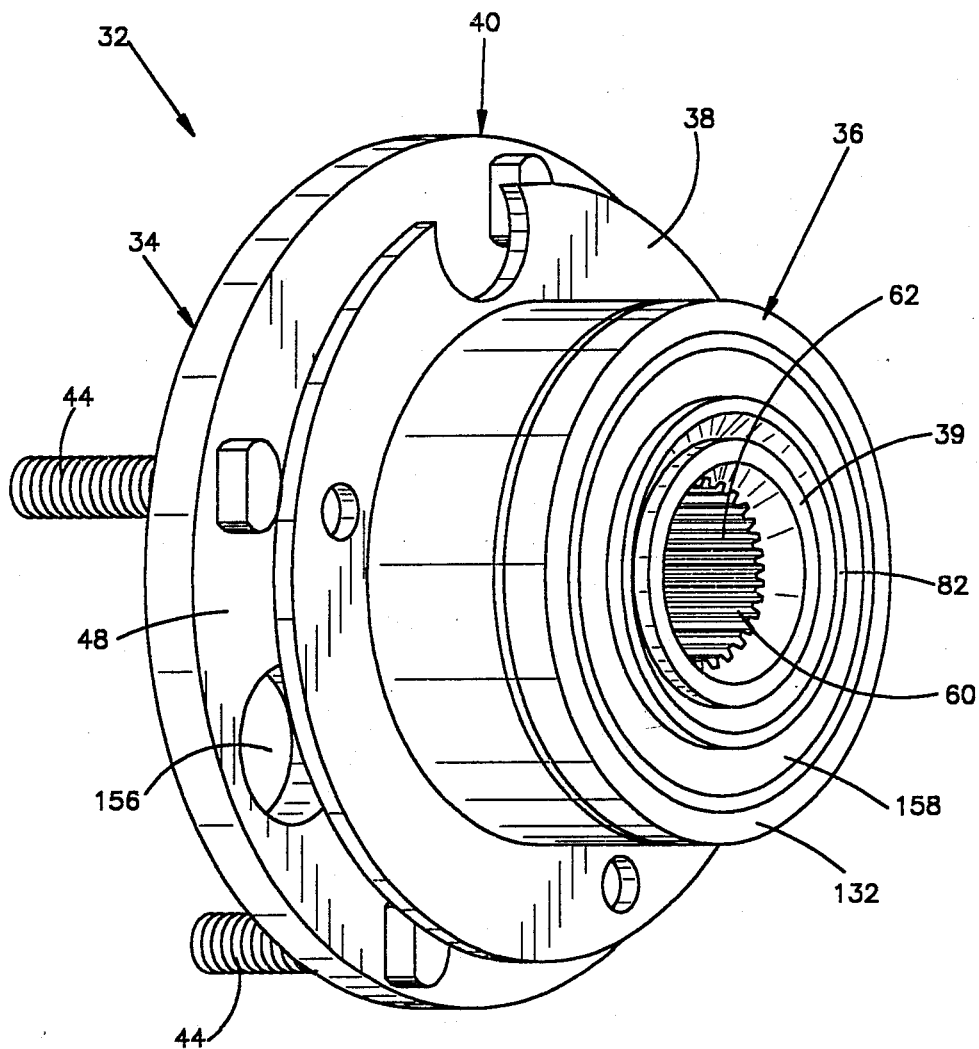
FIG. 2 is a perspective view of a unitary hub assembly constructed in accordance with the present invention and used in the wheel support assembly of FIG. 1.

The hub assembly 32, illustrated in FIG. 2, is a compact unit which includes a hub 34, a bearing assembly 36 and a mounting flange 38. The unitary hub assembly 32 supports the drive shaft 24 in the steering knuckle 12 and supports the wheel for rotation relative to the steering knuckle. The hub assembly 32 transmits drive forces from the drive shaft 24 and steering forces from the steering linkage 16 to the vehicle wheel.

The unitary construction of the hub assembly 32 enables it to be easily installed on the steering knuckle 12. Thus, the hub assembly 32 can be installed as a single component which replaces many components in a known wheel support assembly. In addition, installation of the hub assembly 32 is facilitated by providing a sliding fit, rather than an interference fit, between the hub assembly and steering knuckle. Although the unitary hub assembly 32 could be used as original equipment on front wheel drive vehicles, it is contemplated that the hub assembly may be extensively used as a replacement for worn original equipment components.

The bearing assembly 36 is almost entirely received in the recess 30 in the steering knuckle 12. This enables the steering knuckle 12 to provide solid support for the bearing assembly 36. The solid support for the bearing assembly results in the hub 34 supporting the driven wheel in a desired position relative to a vehicle.

Hub Assembly—Hub

Figure 3:
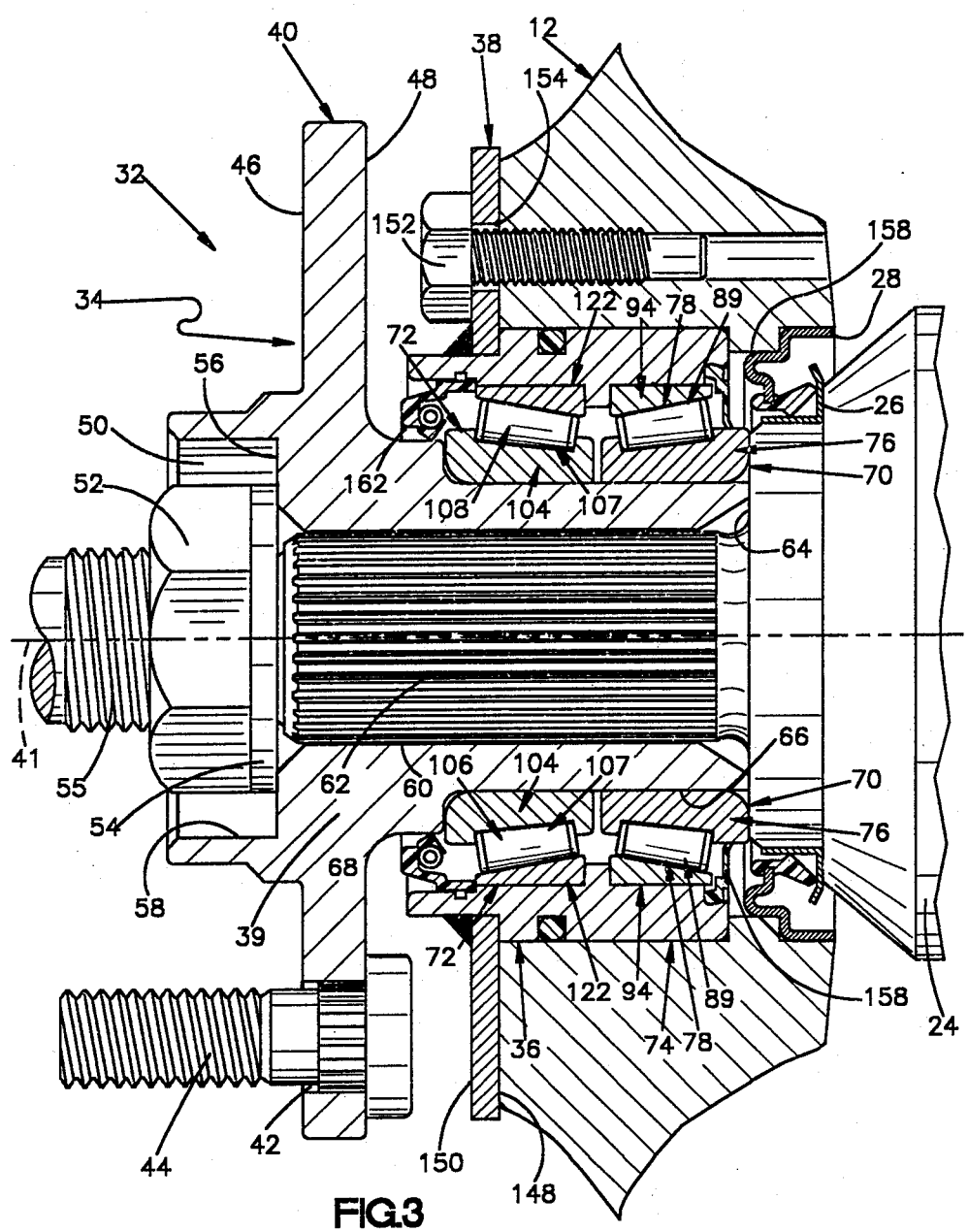
FIG. 3 is a sectional view illustrating the manner in which the unitary hub assembly of FIG. 2 is mounted in a steering knuckle used in the wheel support assembly of FIG. 1.

The metal hub 34 (FIGS. 2 and 3) transmits steering forces and drive forces to the wheel (not shown). The one-piece forged hub 34 has a generally cylindrical center section 39 (FIG. 3). An annular hub flange 40 is integrally formed with and extends radially outwardly from the center section 39. The hub 34 also has a centerline 41 which is coincident with the centerline of the drive shaft 24.

The annular hub flange 40 of the hub 34 has a plurality of openings 42. Wheel bolts 44 extend through the openings 42 and are connectable with the wheel. The centerlines of the wheel bolts 44 are parallel to the centerline 41 of the hub.

The hub flange 40 has a flat annular outer side surface 46 which abuts the wheel. The outer side surface 46 of the hub flange 40 extends perpendicular to the central axis 41 of the hub 34 and to central axes of the wheel bolts 44. The hub flange 40 also has a flat annular inner side surface 48 engaged by head end portions of the wheel bolts 44. The flat annular inner and outer side surfaces 46 and 48 are parallel to each other.

The openings 42 in the hub flange 40 are serrated to hold the wheel bolts 44 from rotating relative to the hub 34. This also prevents the wheel bolts 44 from rotating relative to the wheel. This will keep the wheel connected with the hub so that the steering and drive forces may be transmitted to the wheel.

The center section 39 (FIG. 3) of the hub 34 has a circular recess 50 for a hub nut 52 and a lock washer 54. The hub nut 52 engages a threaded end 55 of the drive shaft 24 to connect the hub 34 with the drive shaft 24. The lock washer 54 abuttingly engages an annular bottom surface 56 of the recess 50. The recess 50 also has a cylindrical side wall 58 which projects axially outwardly. The side walls 58 protect the hub nut 52 during the operation of the vehicle.

The generally cylindrical center section 39 of the hub 34 has axially extending splines 60 which mate with splines 62 on the drive shaft 24. The straight splines 60 and 62 are in circular arrays and extend parallel to the centerline 41. The splines 60 and 62 transmit driving forces between the drive shaft 24 and the hub 34. Therefore, the hub 34 and drive shaft 24 rotate together relative to the steering knuckle 12. Since the vehicle wheel is secured to the hub 34 by the wheel bolts 44, the vehicle wheel rotates with the hub.

The drive shaft 24 has an annular positioning surface 64 which engages one end of the center section 39 of the hub 34. The positioning surface 64 positions the hub 34 and drive shaft 24 axially relative to each other. The positioning surface 64 along with the hub nut 52 prevents the hub 34 and drive shaft 24 from moving axially relative to each other.

The center section 39 of the hub 34 has a cylindrical outer surface 66 which engages and is fixedly secured to the bearing assembly 36. This allows the bearing assembly 36 to support the hub 34 for rotation relative to the steering knuckle 12 so that the drive forces may be transmitted to the wheel. The cylindrical center 39 of the hub 34 also has an annular shoulder 68 to axially position the hub relative to the bearing assembly 36. The bearing assembly 36 is clamped between the shoulder 68 and drive shaft positioning surface 64 by the hub nut 52.

Hub Assembly—Bearing Assembly

The unitary hub assembly 32 includes the bearing assembly 36 which rotatably supports the hub 34 and vehicle wheel. Steering forces are transmitted from the steering knuckle 12 to the hub 34 through the bearing assembly 36. The bearing assembly 36 rotatably supports the hub 34 so that the drive forces transmitted from the drive shaft 24 to the hub 34 rotate the hub and vehicle wheel.

Figure 4:
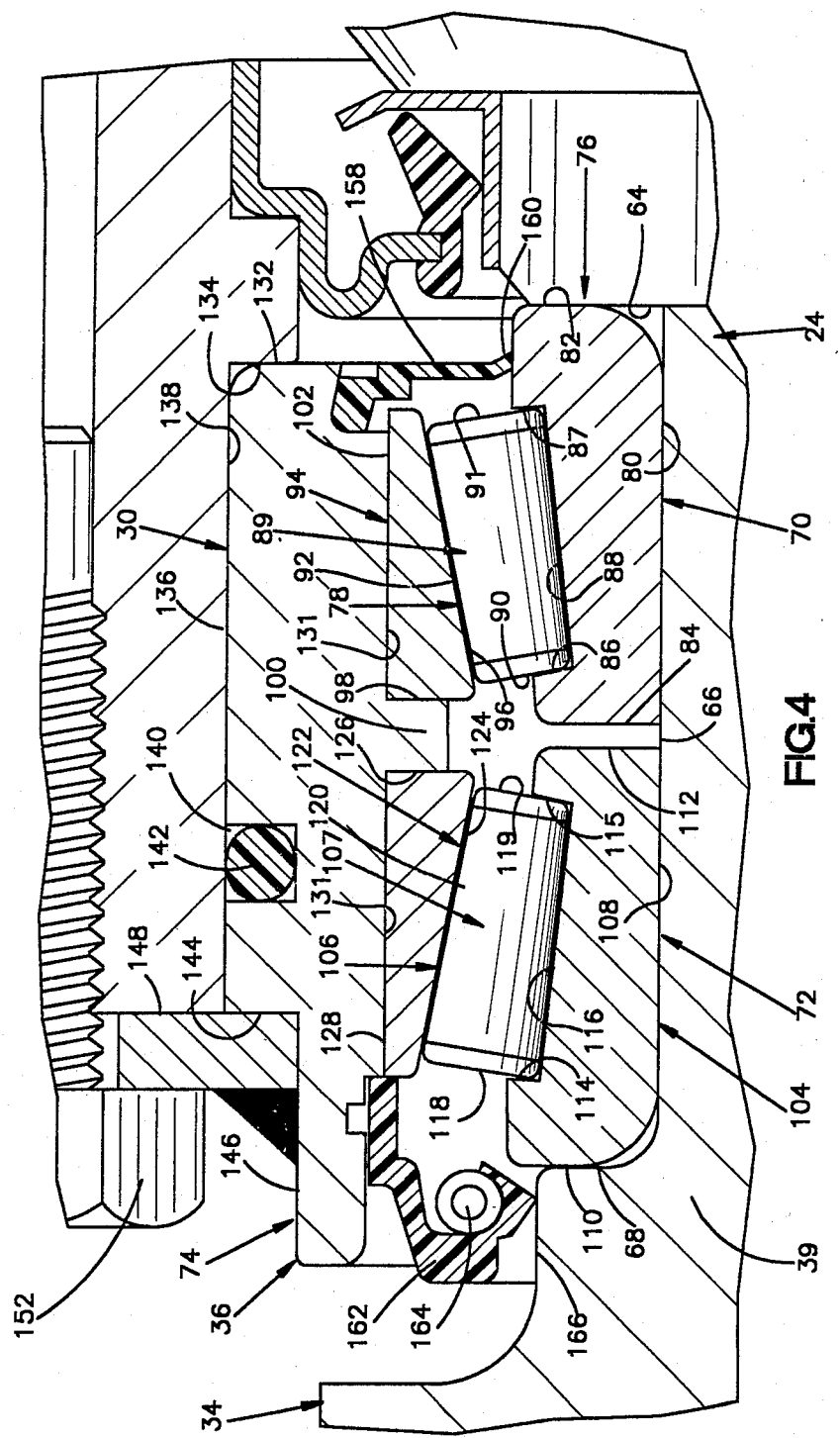
FIG. 4 is an enlarged fragmentary view of a portion of the unitary hub assembly of FIG. 3.

The bearing assembly 36 includes an axially inner bearing 70 (FIGS. 3 and 4), an axially outer bearing 72 and a housing 74 which are disposed in a coaxial relationship with each other and with the hub 34. The axially inner bearing 70 includes an annular metal inner bearing race 76 which is fixedly secured with the hub 34. A circular array 78 of tapered metal roller bearings is disposed in rolling engagement with the inner bearing race 76.

The radially inner bearing race 76 of the axially inner bearing 70 has a cylindrical side surface 80 (FIG. 4) which is fixedly connected with the cylindrical outer surface 66 of the center section 39 of the hub 34. The radially and axially inner bearing race 76 has an annular end surface 82 which engages the annular positioning surface 64 on the drive shaft 24. The inner bearing race 76 also has an annular surface 84 which is axially opposite and parallel to the annular end surface 82. The annular surface 84 is adjacent to and spaced from the outer bearing 72.

The inner race 76 also has a pair of annular shoulders 86 and 87 which engage the circular array of roller bearings 78. The shoulders 86 and 87 prevent the circular array of roller bearings 78 from moving axially relative to the inner race. The inner race 76 also has a tapered surface 88 which engages the circular array 78 of roller bearings. Tapered surface 88 forms a portion of a cone that tapers from a relatively large axially outer radius to a relatively small axially inner radius. The bearing race 76 is the axially and radially inner race of the bearing assembly 36.

Each roller bearing 89 of the circular array 78 of roller bearings has a configuration corresponding to a portion of a cone. The roller bearings 89 have two circular end portions 90 and 91 which engage the shoulders 86 and 87 of the radially inner bearing race. The conical surface 92 of the roller bearing 89 rolls on the tapered surface 88 of the inner race 76 and a radially outer race 94.

The radially outer race 94 (FIG. 4) of the axially inner bearing 70 has a tapered frustoconical surface 96 along which the circular array 78 of bearings 89 rolls. The surface 96 tapers from a relatively large axially inner radius to a relatively small axially outer radius. The bearing race 94 is the axially inner and radially outer race of the bearing assembly 36.

The radially outer and axially inner race 94 has an annular surface 98 which abuts an annular inner flange 100 of the cylindrical housing 74. The metal outer race 94 has a cylindrical outer surface 102 that engages the housing 74. The annular inner race 76, annular outer race 94 and bearings 89 cooperate with each other, the housing flange 100 and the positioning surface 64 to hold the axially inner bearing 70 against axial movement relative to the housing 74 and hub 34.

The axially outer bearing 72 (FIG. 4) has an annular radially inner race 104 which is fixedly connected to the hub 34. A circular array 106 of tapered roller bearings is disposed in rolling engagement with the radially inner race 104. This permits the hub 34 to rotate relative to the steering knuckle 12.

The metal radially inner bearing race 104 of the axially outer bearing 72 has a cylindrical inner surface 108 which is secured to the outer surface 66 of the center section 39 of the hub 34. The radially inner and axially outer bearing race 104 also has an annular surface 110 which abuts the annular shoulder 68 on the center section 39 of the hub 34. The metal inner race 104 has another annular surface 112 which is axially opposite and parallel to the annular surface 110. The annular surface 112 is adjacent to and spaced apart from the annular surface 84 of the radially inner race 76 of the axially inner bearing 70. The bearing race 104 is the axially outer and radially inner race of the bearing assembly 36.

The radially inner race 104 of the axially outer bearing 72 has two annular shoulders 114 and 115 which engage the circular array of roller bearings 106. The shoulders 114 and 115 prevent the circular array 106 of roller bearings 107 from moving axially. The circular array 106 of roller bearings 107 is disposed in rolling engagement with a tapered surface 116 on the inner race 104. The tapered surface 116 forms part of a cone. The surface 116 tapers from a relatively large axially outer radius to a relatively small axially inner radius.

Each of the roller bearings 107 of the circular array 106 of roller bearings has a frustoconical shape. Each of the bearings 107 has circular end portions 118 and 119 which engage the shoulders 114 and 115 of the inner race 104. A frustoconical surface 120 of each of the roller bearings 107 engages the tapered surface 116 of the inner race 104. The roller bearings 107 are axially tapered from the large diameter end portion 118 to the small diameter end portion 119.

The annular radially outer race 122 of the axially outer bearing 72 has a tapered surface 124 which engages the surface 120 of the circular array 106 of roller bearings 107. The metal outer bearing race 122 tapers axially from a relatively large axially inner end portion to a relatively small axially outer end portion The outer race 122 has an annular surface 126 which abuttingly engages the annular flange 100 of the housing 74. The outer race 122 also has a cylindrical outer surface 128 which engages the housing 74. The bearing race 122 is the axially and radially outer race of the bearing assembly 36.

The metal housing 74 has a generally cylindrical inner surface 130 which is fixedly connected to the radially outer races of the bearings 70 and 72. The cylindrical inner surface 130 is divided into two equal size areas by the annular inner flange 100 of the housing 74. The housing 74 also has an annular end surface 132 which abuttingly engages the annular bottom surface 134 of the recess 30 in the steering knuckle 12. Engagement of the end surface 132 of the housing 74 with the bottom surface 134 of the recess 30 positions the bearing assembly 36 relative to the steering knuckle 12.

The housing 74 has a generally cylindrical surface 136 which slidably engages a cylindrical side surface 138 of the recess 30 n the steering knuckle 12. Although there is a tight fit between the outer side surface 136 of the housing 74 and the inner side surface 138 of the recess 30, the bearing assembly 36 can be easily slid into the recess. This allows the hub assembly 32 to be easily installed in the steering knuckle 12 so that none of the components will be damaged.

The housing 74 has an annular recess 140 for a circular O-ring seal 142 between the housing and the steering knuckle 12. The housing 74 has an annular surface 144 axially opposite and parallel to the annular end surface 132. The annular surface 144 is in abutting engagement with the annular flange 38. The housing 74 has a second cylindrical surface 146 which is fixedly secured to the flange 38 by a weld.

Hub Assembly—Flange

The annular metal flange 38 has a flat axially inner surface 148 (FIG. 3) which abuttingly engages the steering knuckle 12 and the annular shoulder surface 144 of the housing 74. At least a major portion of the axially outer bearing 72 is disposed between a plane containing the axially inner surface 148 and a plane containing the annular bottom surface 134 of the recess 30 in the steering knuckle 12. Thus, the axially inner bearing 70 is entirely disposed in the recess 30 in the steering knuckle. The axially outer bearing 72 is almost entirely disposed in the recess 30. This enables the hub assembly 34 to provide a solid support for the vehicle wheel.

The flange 38 has a flat outer surface 150 which is generally parallel to the flat inner surface 148. The flat outer surface 150 abuttingly engages the head portions of flange bolts 152. In this way, the flange 38 may be fixedly engaged with the steering knuckle 12 so that the hub 34 is supported for rotation relative to the steering knuckle 12. This also allows the steering forces in the steering knuckle 12 to be transmitted to the wheel through the hub assembly 32.

The circular array 106 of roller bearings 108 is disposed between a plane containing the flat outer side surface 150 of the flange 38 and the plane containing the annular bottom surface of the recess 30. Thus, the circular arrays 78 and 106 of roller bearings are disposed between the plane containing the outer surface 150 of the flange 38 and the plane containing the bottom surface 134 of the recess 30. Since the flange 38 is firmly anchored to the steering knuckle 12 by the bolts 152, the arrays 78 and 106 of roller bearings are solidly supported.

The flange 38 has a plurality of openings 154 that the flange bolts 152 extend through. The flange bolts 152 can then be bolted to the steering knuckle 12. The annular hub flange 39 of the hub 34 has an opening 156 (FIGS. 1 and 2) to permit access to the flange bolts 152 so they may be tightened to prevent the unitary hub assembly from falling out of the steering knuckle 12.

Hub Assembly—Bearing Seals

A first polymeric bearing seal 158 (FIG. 4) is connected to the housing 74 of the bearing assembly 36. The bearing seal 158 has an annular lip 160 which engages the inner bearing race 76 of the axially inner bearing 70. The inner bearing race 76 can rotate relative to the bearing seal 158 and the housing 74 to which the bearing seal is fixedly connected.

A second polymeric bearing seal 162 is connected to the housing 74 of the bearing assembly 36. The bearing seal 162 includes a circular spring 164 to keep the bearing seal in engagement with an annular outer side surface 166 on the central section 39 of the hub 34. The bearing seal 162 includes a lip 168 which engages the annular outer side surface 166. The hub 34 rotates relative to the bearing seal 162 and housing 74 to which the bearing seal is fixedly connected.

Hub Assembly—Installation

A known vehicle wheel support assembly includes a steering knuckle in which a hub and driven wheel are supported by a bearing assembly. The bearing assembly has an interference fit with a side surface of a recess in the steering knuckle. A drive shaft extends through an opening in the steering knuckle to a hub connected with a driven wheel. Inner and outer circular arrays of ball bearing elements support the hub for rotation relative to the steering knuckle. A gasket and a retainer are bolted to the steering knuckle over the bearing assemblies.

When this known wheel support assembly is to be repaired, the bearing assembly having an interference fit with a side surface of the recess in the steering knuckle is removed from the recess in a known manner. The unitary hub assembly 32 is then installed in the recess 30 of the steering knuckle. Since the housing 74 does not have an interference fit with the inner side surface 138 of the recess 30 in the knuckle 112, the replacement hub assembly 32 can be readily installed in the steering knuckle without damaging the hub assembly.

To install the hub assembly 32, the bearing assembly 36 is slid into the recess 30 of the steering knuckle 12 and over the drive shaft 24. The roller bearing assembly 36 is inserted into the recess 30 by sliding the bearing housing 74 into the recess 30 without interference between the cylindrical outer side surface 136 of the bearing housing and the cylindrical inner side surface 138 of the recess 30. As this is done, at least a major portion of the circular array 107 of roller bearings 106 is positioned in the recess 30. The hub flange opening 156 is then aligned with an opening 154 in the housing flange 38. A flange bolt 152 is then passed through the opening 156 to the opening 154. A tool is then passed through the opening 156 to tighten the flange bolt 152. This is repeated until all the flange bolts 152 are in place. The lock washer 54 is then placed over the end of the drive shaft 24. The hub nut 52 is then tightened onto the drive shaft 24 so that the lock washer 54 is in abutting engagement with the bottom 56 of the recess 50.

From the above description of a preferred embodiment of the invention, those skilled in the art will perceive improvements, changes and modifications. Such improvements, changes and modifications within the skill of the art are intended to be covered by the appended claims.

Having described one specific preferred embodiment of the invention, the following is claimed:

1. A unitary hub assembly for use in mounting a driven wheel on a steering knuckle of a vehicle, said unitary hub assembly comprising a hub adapted to be connected with a drive shaft and the driven wheel, a bearing assembly to support said hub for rotation relative to the steering knuckle, and a flange connected to said bearing assembly and connectable with the steering knuckle to secure said hub assembly to the steering knuckle, said bearing assembly having a cylindrical housing, said housing having outer side surface means for slidably engaging a cylindrical inner side surface of a recess in the steering knuckle and an end surface for engaging a bottom surface of the recess in the steering knuckle, said bearing assembly having a radially outer and axially inner bearing race fixedly connected to said housing and a radially and axially outer bearing race fixedly connected to said housing and coaxial with said radially outer and axially inner bearing race, said bearing assembly having a first circular array of bearing elements disposed in rolling engagement with said radially outer and axially inner bearing race and a second circular array of bearing elements disposed in rolling engagement with said radially and axially outer bearing race, said bearing assembly having a radially and axially inner bearing race fixedly connected to said hub and disposed in rolling engagement with said first circular array of bearing elements and a radially inner and axially outer bearing race coaxial with said radially and axially inner bearing race and fixedly connected to said hub and disposed in rolling engagement with said second circular array of bearing elements, said flange having axially inner surface means for engaging the steering knuckle at a plurality of locations where said flange is adapted to be secured with the steering knuckle, at least a major portion of said second circular array of bearing elements being disposed between an outer plane containing said axially inner surface means on said flange and an inner plane extending parallel to said outer plane and at least partially containing said end surface of said housing so that said first circular array of bearing elements and at least a major portion of said second circular array of bearing elements are in the recess in the steering knuckle when said hub assembly is connected with the steering knuckle.

2. A unitary hub assembly as set forth in claim 1 wherein said hub has an opening to provide access to locations where bolts can connect said flange with the steering knuckle.

3. A unitary hub assembly as set forth in claim 1 wherein said axially inner surface means on said flange includes a flat major side surface which is adapted to be disposed in abutting engagement with the steering knuckle.

4. A unitary hub assembly as set forth in claim 1 wherein said flange has an axially outer surface, said second circular array of bearing elements being disposed between a plane containing said axially outer surface of said flange and said inner plane which at least partially contains said end surface of said housing.

5. A unitary hub assembly as set forth in claim 4 wherein said radially inner and axially outer bearing race is at least partially disposed axially outward of the plane containing said axially outer surface of said flange.

6. A unitary hub assembly as set forth in claim 1 wherein said unitary hub assembly has an inner seal which extends between said housing and said radially and axially inner bearing race and an outer seal which extends between said housing and said hub at a location axially outward of said radially inner and axially outer bearing race.

7. A method of repairing a wheel support assembly comprising the steps of removing a ball bearing assembly having an interference fit with a side surface of a cylindrical recess in a steering knuckle from the recess, mounting a unitary hub assembly on the steering knuckle, said step of mounting a unitary hub assembly on the steering knuckle including providing a unitary hub assembly having a hub adapted to be connected with a drive shaft and the driven wheel, a roller bearing assembly having a generally cylindrical housing enclosing first and second circular arrays of roller bearings, and a flange connected to one end portion of the housing of the bearing assembly, said step of mounting a unitary hub assembly on the steering knuckle further including inserting the roller bearing assembly into the recess in the steering knuckle by sliding the housing into the recess without interference between a cylindrical inner side surface of the recess and an outer side surface of the housing, said step of inserting the roller bearing assembly into the recess in the steering knuckle includes positioning the first circular array of roller bearings entirely in the recess and positioning at least a major portion of the second circular array of roller bearings in the recess, said step of mounting a unitary hub assembly on the steering knuckle further including connecting the flange to the steering knuckle at a plurality of locations disposed radially outwardly of the one end portion of the housing of the bearing assembly.

8. A unitary hub assembly for use in mounting a driven wheel on a steering knuckle of a vehicle, said unitary hub assembly comprising a hub adapted to be connected with a drive shaft and the driven wheel, a bearing assembly to support said hub for rotation relative to the steering knuckle, and a flange connected to said bearing assembly and connectable with the steering knuckle to secure said hub assembly to the steering knuckle, said bearing assembly having a cylindrical housing, said housing having outer side surface means for slidably engaging a cylindrical inner side surface of a recess in the steering knuckle without interference with the cylindrical inner side surface of the recess in the steering knuckle, said housing having an end surface for engaging a bottom surface of the recess in the steering knuckle, said bearing assembly having a radially outer and axially inner bearing race formed separately from and fixedly connected to said housing and a radially and axially outer bearing race formed separately from and fixedly connected to said housing and coaxial with said radially outer and axially inner bearing race, said housing having internal surface means disposed between and in abutting engagement with said radially outer and axially inner bearing race and with said radially outer and axially outer bearing race to locate said bearing races relative said housing, said bearing assembly having a first circular array of roller bearing elements disposed in rolling engagement with said radially outer and axially inner bearing race and a second circular array of roller bearing elements disposed in rolling engagement with said radially and axially outer bearing race, said bearing assembly having a radially and axially inner bearing race formed separately from and fixedly connected to said hub and disposed in rolling engagement with said first circular array of roller bearing elements and a radially inner and axially outer bearing race coaxial with said radially and axially inner bearing race and formed separately from and fixedly connected to said hub and disposed in rolling engagement with said second circular array of roller bearing elements, said flange having axially inner surface means for engaging the steering knuckle at a plurality of locations where said flange is adapted to be secured with the steering knuckle, at least a major portion of said second circular array of roller bearing elements being disposed between an outer plane containing said axially inner surface means on said flange and an inner plane extending parallel to said outer plane and at least partially containing said end surface of said housing so that said first circular array of roller bearing elements and at least a major portion of said second circular array of roller bearing elements are in the recess in the steering knuckle when said hub assembly is connected with the steering knuckle.

9. A unitary hub assembly as set forth in claim 8 wherein said hub has an opening disposed radially outwardly of said first and second circular arrays of roller bearing elements to provide access to locations where bolts can connect said flange with the steering knuckle.

10. A unitary hub assembly as set forth in claim 8 wherein said flange has an axially outer surface, said second circular array of roller bearing elements being disposed between a plane containing said axially outer surface of said flange and said inner plane which at least partially contains said end surface of said housing.

11. A unitary hub assembly as set forth in claim 10 wherein said radially inner and axially outer bearing race is at least partially disposed axially outward of the plane containing said axially outer surface of said flange.

12. A unitary hub assembly as set forth in claim 8 wherein said unitary hub assembly has an inner seal which extends between said housing and said radially and axially inner bearing race and an outer seal which extends between said housing and said hub at a location axially outward of said radially inner and axially outer bearing race.

* * * * *